Sept. 9, 1969   J. W. ALLEN   3,465,566
METHOD OF FORMING CELLULAR CORE MEMBER FROM FLAT SHEET
Filed July 7, 1967   4 Sheets-Sheet 1

Inventor
John W. Allen
By Sabin C. Bronson
Atty

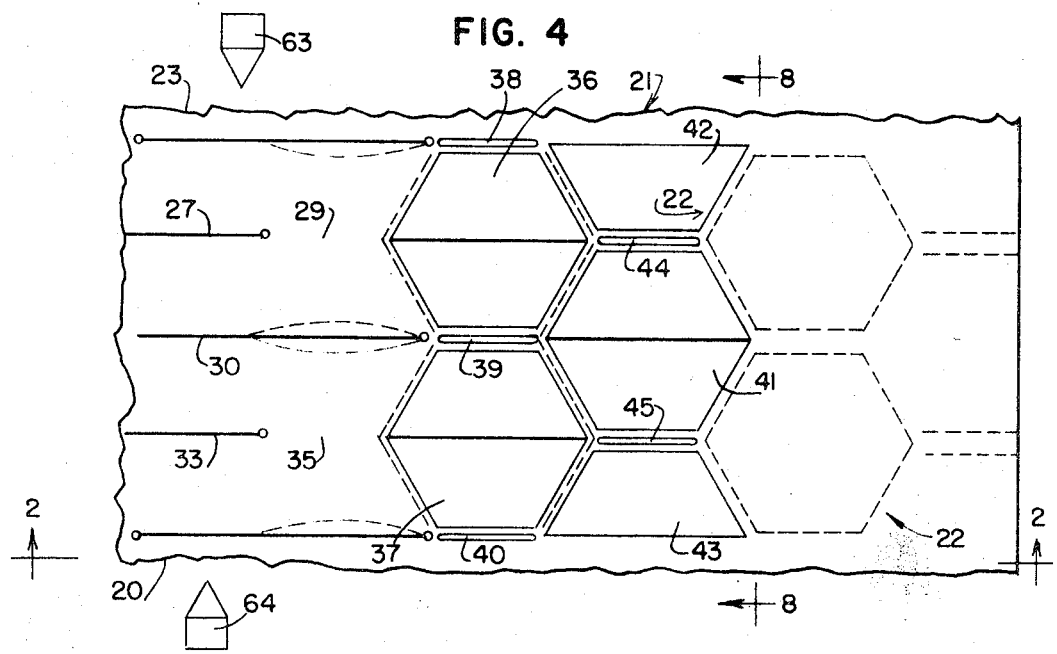
FIG. 4
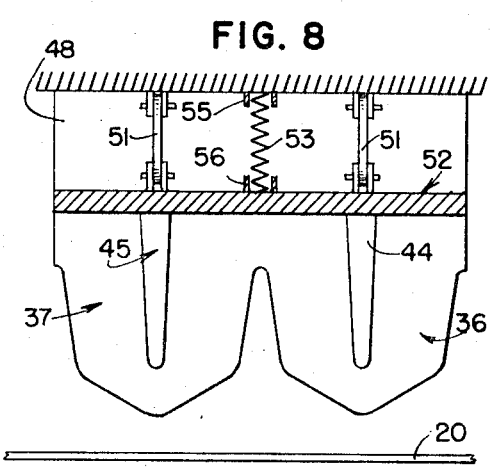
FIG. 8
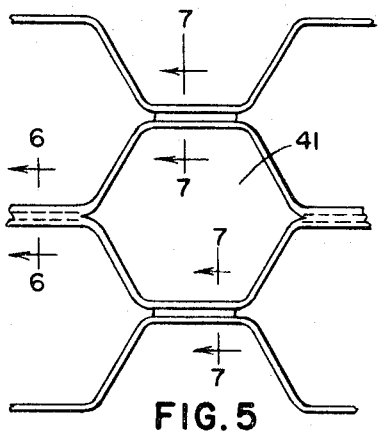
FIG. 5  FIG. 6  FIG. 7
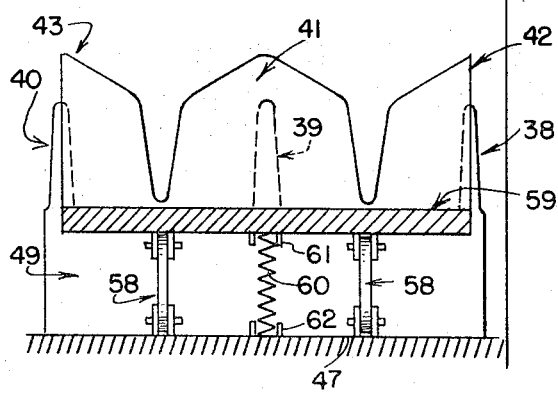
Inventor
John W. Allen Sept. 9, 1969  J. W. ALLEN  3,465,566
METHOD OF FORMING CELLULAR CORE MEMBER FROM FLAT SHEET
Filed July 7, 1967  4 Sheets-Sheet 3
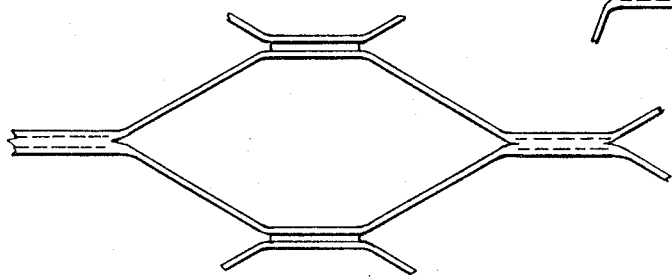
FIG. 9
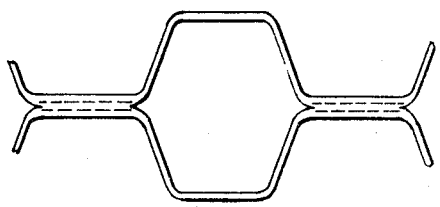
FIG. 10
FIG. 11
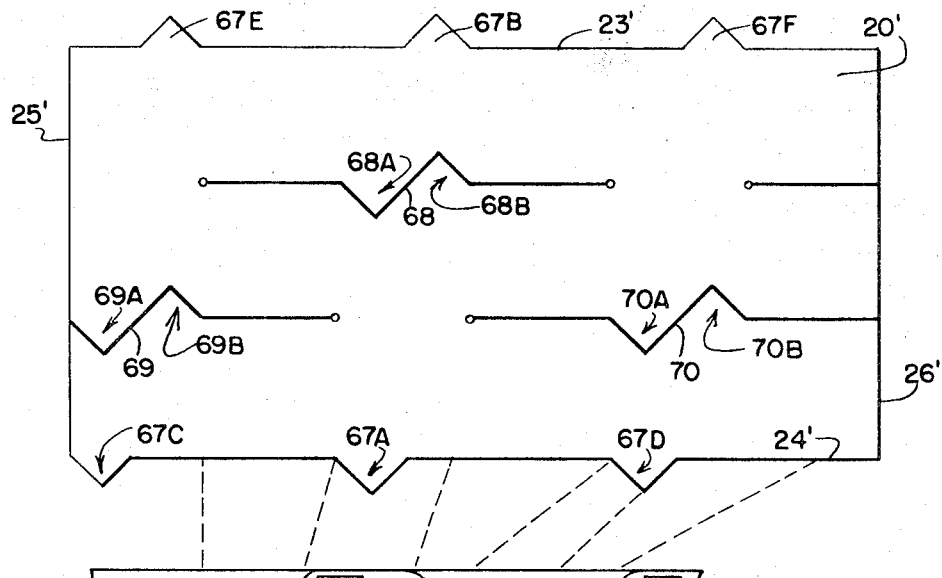
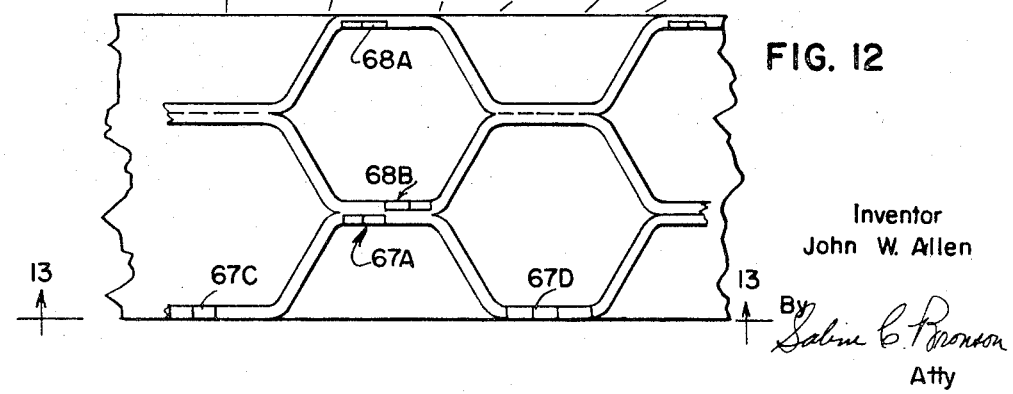
FIG. 12
Inventor
John W. Allen
By
Sabine C. Bronson
Atty Sept. 9, 1969    J. W. ALLEN    3,465,566
METHOD OF FORMING CELLULAR CORE MEMBER FROM FLAT SHEET
Filed July 7, 1967    4 Sheets-Sheet 4

Inventor
John W. Allen
By Sabin C. Bronson
Atty.

United States Patent Office 3,465,566
Patented Sept. 9, 1969

3,465,566
METHOD OF FORMING CELLULAR CORE MEMBER FROM FLAT SHEET
John W. Allen, Flossmoor, Ill., assignor to Stanray Corporation, Chicago, Ill., a corporation of Delaware
Filed July 7, 1967, Ser. No. 651,777
Int. Cl. B21d *43/28;* B21c *37/02*
U.S. Cl. 72—324                     11 Claims

ABSTRACT OF THE DISCLOSURE

A honeycomb-type cellular core having a plurality of contiguous hexagonal cells integrally formed from a single flat rectangular sheet of metal. The method for so forming such panel includes the first step of slitting the metal in a number of spaced accurately positioned lines extending parallel to each other and to a respective pair of opposite side edges of said sheet, said method further including the steps of placing said slit sheet in a preselected position between a series of oppositely disposed hexagonally-shaped punches and associated metal bending means in a press and then operating said press to bend said sheet into an integral cellular panel.

BACKGROUND OF INVENTION

The invention pertains to the field of honeycomb-type cores of metal adapted for use in a variety of panels or similar type structures and to the metal deforming art in which co-acting punches with associated metal bending means are simultaneously used in a press against top and bottom surfaces of a flat rectangular sheet of metal so as to form this metal sheet into the desired type of structure.

The applicant is, of course, aware that the prior art has taught a variety of ways of manufacturing honeycomb-type metal cores of the general type contemplated by the applicant. It is known, for example, to fabricate honeycomb-type cores by use of a plurality of corrugated strips of metal which are bonded together by the use of cements, welding and crimping or other metal securing means. Also, it has been previously known that in making metal grates a metal plate can be slit and bent and then vertically twisted to form hexagonal-shaped cells through a suitable rectifying operation.

Unfortunately, previously used techniques for producing the honeycomb-type core structures have not been completely satisfactory from either a quality or a production standpoint. For example, it has been found that cements may deteriorate and the component parts of the core structure can become separated from one another under conditions of high temperature and high order stresses. Likewise, where a number of structural pieces must be assembled and formed into an integral core through the use of welding or other metal securing techniques, it often occurs that such techniques for securing the individual pieces are not uniform in quality and in certain cases this lack of uniformity can result in a breakdown or deterioration of the core structure. Furthermore, production schedules which involve the assembly of a number of component parts that must be then set up and individually secured together by whatever means necessary, or which involve a number of operations, tend to result in slow schedules and higher costs.

SUMMARY OF THE INVENTION

In general my invention involves the transformation of a single flat rectangular sheet of metal into an integral honeycomb-type structure by means of metal-working steps involving slitting the metal sheet and then pressing this slit sheet between specially designed punches and associated bending means to complete the core in one operation, or a series of successive operations. The metal sheet can be slit by well-known means and it is sufficient to state at this point that such slits will be spaced apart and lie in parallel lines either lengthwise or across the width of the metal sheet. The punches used in carrying out my invention are of hexagonal or other shape and the associated bending means comprise relatively narrow straight and upstanding blade portions.

Applicant's invention avoids the objectionable features inherent in previously devised means for producing the cellular-type core structure. This is accomplished by reducing the number of steps involved in the metal forming operation through the use of the novel punches and associated blade portions which can act in one operation on an accurately slit metal sheet to transform this sheet into an integral cellular-type core as more fully set out below.

BRIEF DESCRIPTION OF THE DRAWINGS

FIGURE 4 shows a diagrammatic plan view of a flat sheet of metal, a forming tool area, and an outline of the cellular panel as formed;

FIGURE 5 is a plan view of a portion of the cellular-type core as formed from a slit metal sheet;

FIGURE 6 is a sectional view taken on line 6—6 of FIGURE 5;

FIGURE 7 is a sectional view taken on line 7—7 of FIGURE 5;

FIGURE 8 is a side view taken along the line 8—8 of FIGURE 4, showing the relative position of the cooperating pairs of punches and blades;

FIGURE 9 shows a type of elongated cell that can be formed according to the invention;

FIGURE 10 shows a type of flattened cell that can also be formed according to the invention;

FIGURE 11 is a plan view of a metal sheet with slits and edge projections to provide triangular-shaped tabs;

FIGURE 12 is a plan view of a cellular core with tabs as formed from the slit metal sheet shown in FIGURE 11;

DESCRIPTION OF THE PREFERRED EMBODIMENTS

Figure 1:
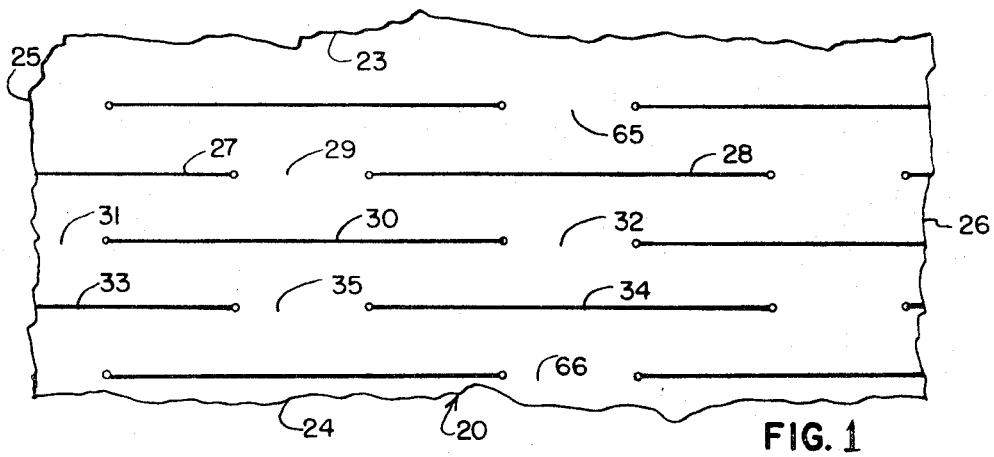
FIGURE 1 is a plan view of a portion of a slit metal sheet before being formed into the cellular-type core.

Referring to FIGURE 1 of the drawings, a flat metal sheet with slit lines and unslit portions is shown generally at 20. The metal sheet 20 has lengthwise extending parallel side edges 23 and 24 and transversely extending side edges 25 and 26. These sides edges of the sheet are broken to indicate that only a portion of the sheet is shown. As seen in this figure, there is a first slit line with slits 27 and 28 separated by an aligned unslit portion 29 of the sheet. A second slit line includes a slit 30 with aligned unslit portions 31 and 32. A third slit line has slits 33 and 34 separated by an aligned unslit portion 35.

In FIGURE 1 it should be noted that the three slit lines are parallel to each other and to the side edges 23 and 24. Each slit must be of the same length and the center of an unslit portion in one slit line must be at the center of the slits in the two adjacent slit lines. At this point it should also be stressed that FIGURE 1 shows only a portion of a full metal sheet and that the metal sheet could have a number of slit and unslit sections generally similar in pattern to those shown in the figure. It is also important to understand that the distance between parallel slit lines must be equal to the desired depth of the cellular panel to be formed from the flat sheet, and this feature will also be discussed more in detail later. The actual sheet slitting operation is not described in detail since this may be accomplished in a number of well-known ways such as roll slitting or multiple punches and shear blades on a mechanical press.

Turning now to FIGURE 4, the flat metal sheet 20 has been labeled to correspond to the view of the sheet as seen in FIGURE 1. Thus, side edges 23 and 24 are shown along with slits 27, 30 and 33 and with unslit sections 29 and 35. As thus positioned, it will be observed that the forming tools in the central area 21 are precisely positioned in regard to the slit lines in the sheet 20.

Figures 2, 3:
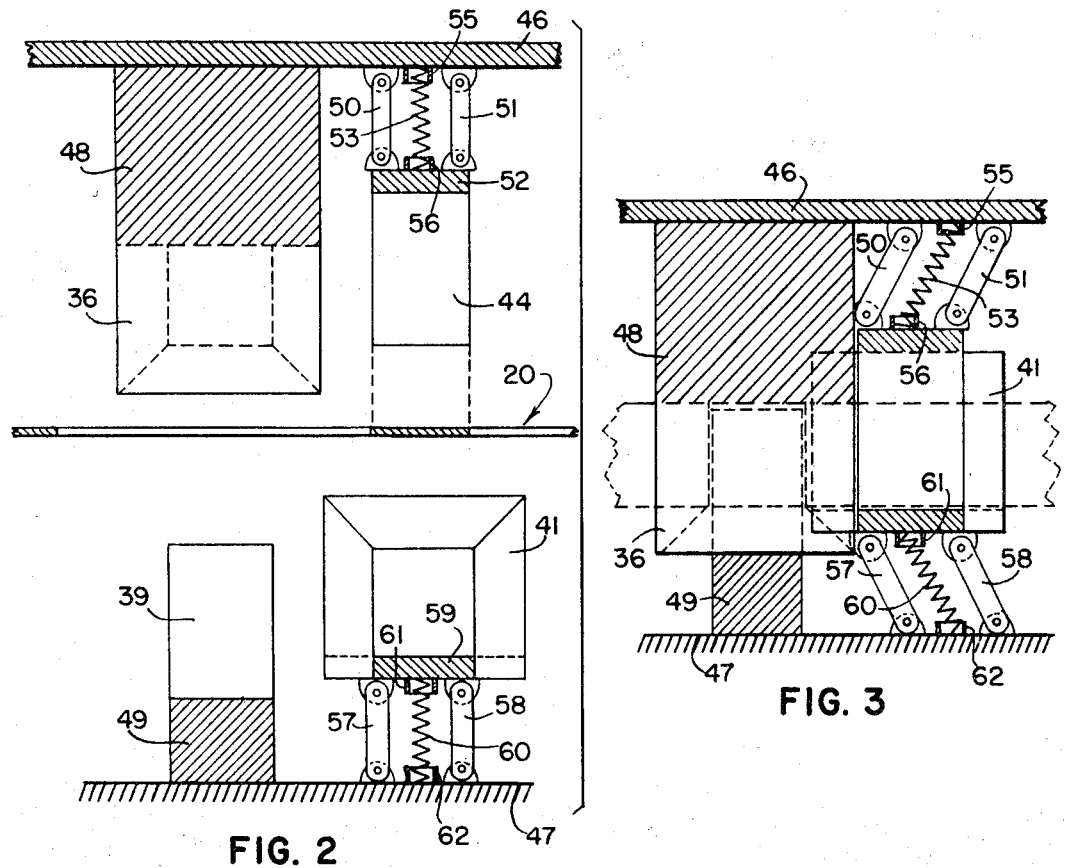
FIGURE 2 is a front view taken along line 2—2 of FIGURE 4 and showing two pairs of associated punches and blades, on opposite sides of the slit sheet, prior to forming.
FIGURE 3 is a view similar to FIG. 2 showing the position of the punches and blades after the metal forming operation.

Before going into a detailed description of the forming tools in the tool area generally indicated at 21, it should also be explained that in FIGURES 2 and 3 only a few of the tools that would normally be used to work on a metal sheet are shown. However, it is believed that by considering only a limited number of tools and their mode of operation on a portion of a metal sheet, an adequate description can be made because all the forming tools in a complete press will function in a similar manner.

As seen in FIGURE 4, forming tools include punches and associated blades. For the purpose of this description, a lines of punches 36 and 37 with associated blades 38, 39 and 40 will be called tool line number one. Tool line number two lies adjacent to tool line number one and includes punch 41, partially shown punches 42 and 43, and blades 44 and 45. The punches are shown as being hexagonally-shaped with a ridge edge and the blades are relatively narrow plates.

In FIGURES 2 and 3 it can be clearly seen that the punches 36 and 37, in tool line number one, are positioned and carried above the metal sheet 20 in a press ram 46, while punches 41, 42 and 43, in tool line number two, are disposed below the sheet and supported on press bed 47. Blades 38, 39 and 40 are also carried on the press bed 47, while blades 44 and 45 are carried by the press ram 46. It should be particularly noted at this point that blades 38, 39 and 40 are positioned opposite to the spaces between punches in the tool line number one and, as an example, as seen in FIGURE 4, blade 39 is positioned between punches 36 and 37. In like manner, the blades 44 and 45, carried in the tool line number two and by the press ram 46, are positioned to fit within the spaces between punches 41, 42 and 43.

In FIGURES 2 and 3 it will be seen that the punches and blades in tool line number one, as an example punch 36 and blade 39 as seen in these figures, are rigidly mounted on the press ram 46 and the press bed 47. Punch 36 is carried on metal block 48 while blade 39 is carried on metal block 49. In contrast, the punches and blades in tool line number two, for example punch 41 and blade 44, are movably secured to the press elements. While one means of so movably mounted the punches and blades is disclosed herein, it should be appreciated that any suitable means can be used provided that the punches and blades in the one tool line can move laterally toward an adjacent tool line during the sheet forming operation. This mode of operation will be discussed later in conjunction with FIGURE 8 of the drawings.

With specific reference to the disclosed movable mounting means for the tools in tool line number two, it can be observed that the means for blade 44 includes two rocker arms 50 and 51 that are pivotally supported on press ram 46. Arms 50 and 51 depend from the press ram 46 and are pivotally secured to the support plate 52 for blade 44. In order to resiliently urge the blade 44 to a vertical position, as seen in FIGURE 2, when the blade is not contacting sheet 20, a prestressed coil spring 53 is disposed between the surface 54 of press ram 46 and the top surface of support plate 52. Cups 55 and 56 on surface 54 and the top surface of support plate 52 respectively, accurately position this spring 53.

The support means for the punch 41 include the rocker arms 57 and 58 which are pivotally mounted on the press bed 47 and extend upwardly to a pivotal mounting on the plate 59 supporting punch 41. Spring 60 is disposed between cups 61 on the support plate 59 and cup 62 on the top surface of the press bed 47.

As previously mentioned, the exact positioning of the sheet 20 in the press with relation to the tool lines is important and reference is again made to FIGURE 4. Sheet 20 is, of course, guided and initially positioned along the tool lines by suitable guides as indicated diagrammatically at 63 and 64. These guides are not shown in detail but it is believed that well-known techniques can be used and a specific description is not needed here. However, note that as the sheet 20 is thus positioned in the press tool lines, the ridge line of punch 36 will be aligned with slit line number one adjacent the unslit portion 29. Blade 39 in tool line number one is aligned with slit line number two adjacent to slit 30 and the ridge line of punch 37 is aligned with the slit line number three adjacent the unslit portion 35.

Having the above arrangement in mind and referring also to FIGURES 2 and 8, it is believed apparent that punches 36 and 37 will be positioned over the sheet 20 with their respective ridge lines downwardly positioned over and aligned with the slits 28 and 34 respectively. Also, the upwardly directed blade 39 of tool line number one will be aligned with the unslit portion 32 of slit line number two. In like manner, blades 38 and 40 will be aligned with unslit portions 65 and 66 respectively of adjacent slit lines. Furthermore, it will be appreciated that tool line number two is also positioned relative to the slit and unslit areas of sheet 20 but with the punches and blades reversed in position over and under sheet 20 relative to the punches and blades positioned in tool line number one. Each tool line can have the desired number of punches and blades extending transversely across the sheet 20 to accommodate the desired width of a particular sheet and any desired number of tool lines can be used.

Before describing the manner in which the press forms the core according to my invention, it is desirable to consider specific examples of relative slit length and uncut spacing in the sheet 20. It has been found that if the length of the slits is three times the length of the uncut portions between adjacent aligned slits, then the formed core will have a true hexagonal-shaped cell formation. This, of course, is not always critical or even perhaps desirable so that other proportions of slit length and uncut portions can be used. Thus referring to FIGURE 9, the elongated cell formation is indicated which results when the slit length is more than three times the uncut portion between adjacent slits. Referring then to FIGURE 10, a flattened type of cell is shown which results when the length of the slit is less than three times the length of the uncut portion.

Assume now that the sheet 20 has been slit so that the slit lengths are three times the uncut portion and the sheet 20 has been accurately positioned in the press. Power can then be applied to the press to start the movement of the upwardly and downwardly directed sets of punches and blades toward the metal sheet 20. As this movement continues, the ridge lines of the respective punches enter and start spreading the slit portions of the sheet. As the movement of the punches toward each other continues, the topmost edges of all the blades contact the unslit portions and the sheet 20 is punched and bent to the final cellular form. The jaws of the press can then, of course, be retracted from the metal.

For a better understanding of exactly how the interlocking lower and upper portions and blades in the press actually form the metal sheet 20, attention is now directed to FIGURE 5. This figure shows a portion of a cellular core and it will be noted that the central hexagonal portion of this figure represents the spread of the sheet material which is accomplished by one of the punches in the press. Assuming for the moment that this punch is the punch 41 as seen in FIGURE 4 of the drawings, it will be recalled that this punch acts upwardly, entering the slit portion of sheet 20 aligned therewith, which folds and spreads the material adjacent the slit into the shape of the punch, in this instance hexagonal. Blades 44 and 45 force the unslit material in adjacent slit lines down over punches 42, 43 and 44 in tool line number two.

This folding of the material causes a contraction of the sheet in the longtiudinal direction of the slits, but no contraction of the sheet in the transverse direction of the slits. Looking at a cross-sectional view FIG. 6, taken along line 6—6 of FIGURE 5, it can be seen that the connecting walls between adjacent hexagonal-shaped parts of the core are formed by the blades 38 and 39 into downward directed U-shaped walls or saddles. In a like manner the blade 44 in tool line number two has been simultaneously downwardly directed against the unslit portion of sheet 20 to form an upwardly directed U-shaped wall or wall as seen in the cross section view FIG. 7, taken on line 7—7 in FIGURE 5.

Attention has previously been called to the fact that the tool line number two is movably mounted so as to be movable laterally relative to the tool line number one. This feature is extremely important in this invention because the sheet of metal must be allowed to contract in the direction of the slit lines during the forming operation. If this is not done, the unslit areas in the sheet will develop cracks and tend to split open. For this reason tool line number two, as movably mounted, acts not only to punch and bend but also to gather the sheet material in the direction of the slits during the press operation. As can be seen in FIGURE 3, tool line number two is displaced to the final position after the forming operation. It can also be noted that the springs 53 and 60 on blade 44 and punch 41, respectively, deform during the forming operation but as the press is opened up and the punches and blades retracted from the core, these springs will act to position the blades and punches for the next operation as seen in FIGURE 2. While only one tool line is shown as being movably mounted, it will be understood that in a complete press other tool lines may also be movably mounted to achieve a desired result.

In the actual forming of the sheet as heretofore described, the sheet is folded initially by the cooperating punches in a first stage wherein the unslit area of the sheet is bent approximately 45° in a direction opposite to the 45° bend on an adjacent parallel slit line. At this stage the cells are not completely formed and a final forming stage involving the blades takes place. In this final stage the blades acting on the unslit aligned portions in each slit line complete the bends and the main unslit areas of the sheet are folded so that all portions of the panel material lie in a direction of 90° to the original plane of the flat sheet. A vertical press has been illustrated in the disclosure for holding the associated punches and blades and for providing the power means to force these elements against a metal sheet which is to be formed. It is contemplated, however, that other devices can be used if desired and the inventive concept involved here resides in a metal forming method wherein the sheet is folded along the parallel slit lines with adjacent lines being folded in opposite directions relative to the orginal plane of the sheet. Furthermore as previously stressed, the tool lines must function to contract the sheet only along the slit lines and not in a direction perpendicular to said slit lines.

If the slits are disposed transversely of the sheet, then the tool lines must be positioned transversely across this sheet and must include a means for gathering the material transversely of the sheet. Such means can include movable punches and blades, as previously described, which will contract the sheet transversely during the forming operation.

While the disclosure shows the use of hexagonally-shaped punches, the invention is not restricted to this particular shape of punch. See for example FIGS. 9 and 10 for typical variations in shape for core. Experience has shown that rectangularly-shaped punches can also be used to form substantially hexagonally-shaped cells in the core.

Figure 13:
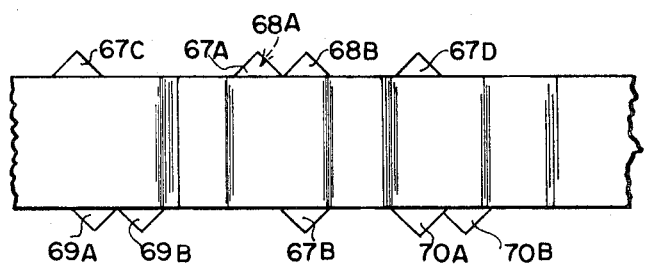
FIGURE 13 is a side elevation along the line 13—13 of FIGURE 12.

If it is necessary to provide tabs on the core so that the core can be fastened to other pieces of material, such as a skin sheet, the process can be initiated at the time the sheet is slit. For a specific example of such an operation, attention is now directed to FIGURES 11, 12 and 13 of the drawings.

In FIGURE 11 a sheet 20', comparable to the metal sheet 20 hereinbefore described, is shown with corresponding sides edges 23', 24', 25' and 26'. The side edges 23' and 24' have a plurality of triangular-shaped projections 67A to F and the central portions of the slits are of zigzag shape as generally indicated as 68, 69 and 70. This sheet, when formed by the punches and blades in the manner as previously described, will produce the cellular core as shown by a top plan view in FIGURE 12 of the drawings. As seen in FIGURE 12, the tabs are projected upwardly and are formed from the triangular-shaped projection 67 originally positioned along side edge 24'. The double tab, generally indicated at 68A and 68B, is formed from the slit line having the one zigzag portion 68. It will be understood that at the bottom of the core similar tabs will be formed from the triangular-shaped projections 67 originally positioned along side edge 23' and from the two sets of zigzag portions 69 and 70 in the other slit line.

Figure 14:
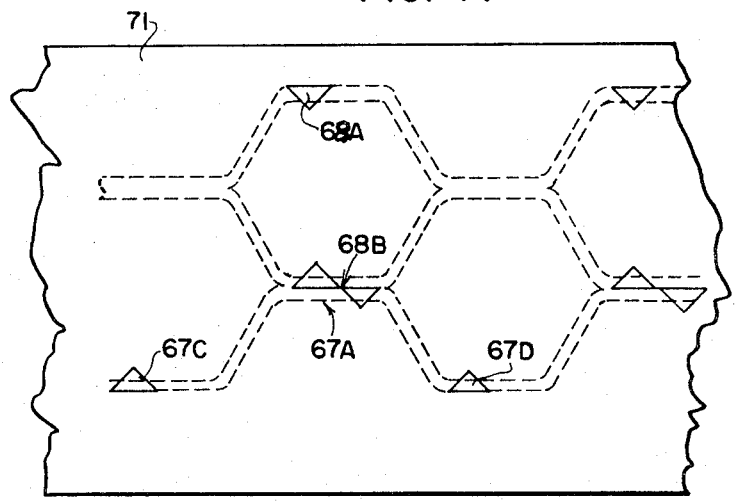
FIGURE 14 is a plan view of a skin sheet fastened to a cellular core with the triangular-shaped tabs as formed from the sheet in FIG. 11.

As seen in FIGURE 14, a skin sheet 71 is fastened to a core by means of the tabs 67, 68A and 68B that project through the skin sheet and are bent over. If the skin sheet is thin enough, the tabs can be forced through the sheet, or if not, the skin sheet may be slit to receive the tabs.

From the foregoing it is evident that I have devised a means of transforming a flat sheet of material into an integral cellular core member and the above description of the invention taken with the accompanying drawings is believed to be amply sufficient for one skilled in this art to make and perform the invention.

I claim:

1. The method of forming a flat sheet of ductile material into a cellular core panel having a plurality of contiguous cells having side walls of constant size and depth throughout the entire panel and extending at right angles to the original plane of the sheet, including the steps of slitting said sheet in a series of spaced apart lines parallel to each other and to opposite side edges of said sheet and with said slits in adjacent lines being lengthwise offset from each other, placing said slit sheet between relatively movable tool means having a plurality of tool lines, each of said tool lines having oppositely facing and laterally offset punches and forming blades, the punches in one tool line being longitudinally aligned with the blades in the adjacent tool lines, aligning said sheet between the oppositely facing punches and blades with the punches facing the slits in the sheet and the blades facing the unslit portions of the slit lines, applying power to the tool means so that the blades on one side of the sheet force the sheet into spaces between the punches on the other side of the sheet as the punches are being forced into the slits of the sheet to spread said slits apart and contact said sheet in the direction of said slits to form cellular shapes whereby the sections of the flat sheet about the slits are rotated 90° from the plane of the flat sheet and define a substantially U-shaped saddle at the unslit portions about said forming blades.

2. The method as in claim 1 including the step of moving the punches and blades in one tool line toward an adjacent tool line as said punches and blades contact said sheet and thereby contract said sheet in the direction of the slit lines.

3. The method as in claim 1 including the step of moving the punches and blades in at least one of said tool lines so that as this tool line is urged into contact with the sheet, said punches and blades will also be moved toward an adjacent tool line to contract the sheet in the direction of the slit lines.

4. The method as in claim 1 wherein the punches are of hexagonal shape.

5. The method as in claim 1 wherein the tool means is a press in which the punches of adjacent tool lines are alternately positioned and carried by the press bed and ram.

6. The method as in claim 1 wherein the slits are all of equal length and the slit lines are spaced equal distances apart.

7. The method as in claim 1 wherein the slits in the sheet have a zigzag section whereby tab means can be formed on the core panel.

8. The method as in claim 1 wherein the punches are of non-circular shape in cross section.

9. The method as in claicm 1 wherein the slits are spaced apart a distance equal to the depth of the cellular core panel formed by said method.

10. The method as in claim 1 wherein the width of the resulting cells is twice the depth of the cell.

11. A method of forming a cellular core panel comprising forming a plurality of longitudinal lines of spaced lengthwise extending slits in a flat sheet, the slits in adjacent lines being in offset relationship to each other so that the center portions of said slits are transversely aligned with the unslitted portions in the adjacent lines thereby to define transverse rows of slits including alternate slit and unslit portions, rotating the portions of the flat sheet between the slits in alternate rows in a clockwise direction while simultaneously rotating the portions of the flat sheet between the slits in the remaining rows in a counterclockwise direction to open said slits and form open cells in said panel, by means of simultaneously applying oppositely directed saddle forming means at said unslit portions about which the metal in the region of the unslit portions in adjacent lines is bent so as to form alternate rows of upright and inverted saddles.

References Cited

UNITED STATES PATENTS

| | | | |
|---|---|---|---|
| 854,927 | 5/1907 | Clark | 113—116 |
| 1,090,843 | 3/1914 | Golding | 113—116 |
| 1,210,849 | 1/1917 | Scammell | 113—116 |
| 1,733,778 | 10/1929 | Connell | 113—116 |
| 1,983,412 | 12/1934 | Smith | 29—6.1 |
| 2,692,019 | 10/1954 | Zalkind | 113—116 |
| 2,828,843 | 4/1958 | Hill | 52—180 |
| 3,162,942 | 12/1964 | Christman | 29—455 |

CHARLES W. LANHAM, Primary Examiner

E. M. COMBS, Assistant Examiner

U.S. Cl. X.R.

29—455, 6.2; 72—377, 379; 113—116